United States Patent [19]
Dunlap

[11] 3,979,967
[45] Sept. 14, 1976

[54] SHIFT CONTROL DEVICE
[75] Inventor: Jesse Lee Dunlap, Fresno, Calif.
[73] Assignee: California Traders, Fresno, Calif.
[22] Filed: July 30, 1975
[21] Appl. No.: 600,468

[52] U.S. Cl. .............................. 74/475; 74/548; 74/553; 74/511 R
[51] Int. Cl.² .................. G05G 1/12; G05G 5/02; G05G 9/12
[58] Field of Search ................ 74/473 R, 475, 504, 74/511, 548, 553

[56]         References Cited
          UNITED STATES PATENTS
2,995,961   8/1961   Eldridge et al. ............... 74/548 X
3,045,503   7/1962   Kiessling ....................... 74/548 X Primary Examiner—Allan D. Herrmann
Attorney, Agent, or Firm—Owen, Wickersham & Erickson

[57]           ABSTRACT

A shift control device adapted for installation on a conventional pneumatic transmission control switch for trucks to convert its lever action to an easily controllable twisting or turning action and one that prevents inadvertent "down-shifting." The device includes a ball-like knob adapted for connection to the head of a standard pneumatic transmission control with a radially extending fork portion that fits over the lever for the control. The knob is rotatably supported on a central pin attached to the control head so that turning it will move the control level, its travel being limited so that downward force must be applied on the knob before the control lever can be moved to its low range position.

10 Claims, 4 Drawing Figures

U.S. Patent  Sept. 14, 1976  3,979,967
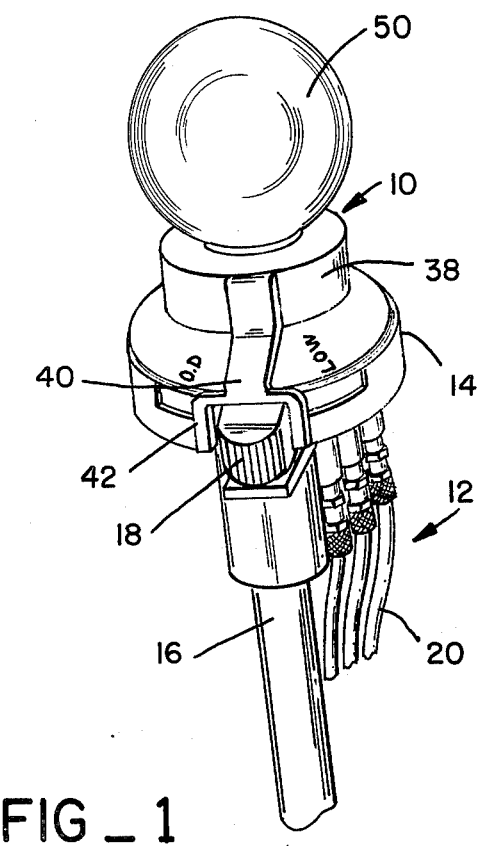
FIG_1
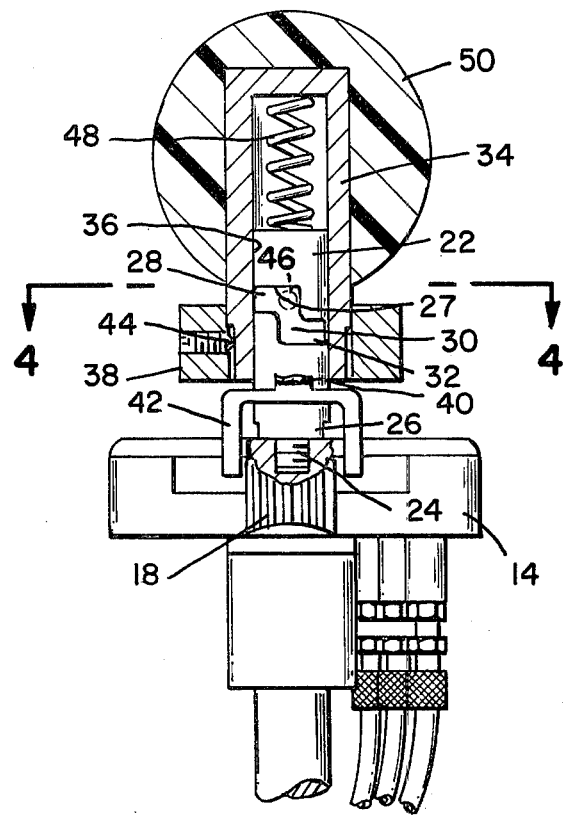
FIG_2
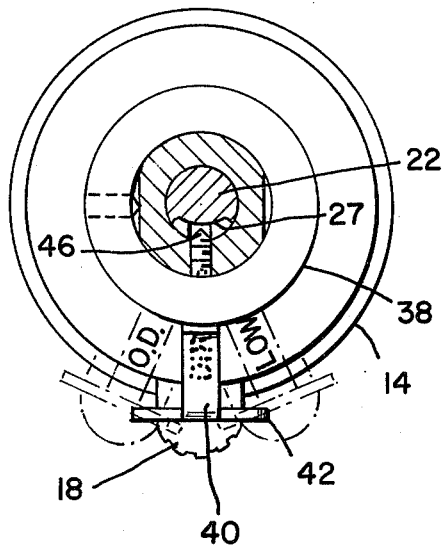
FIG_4
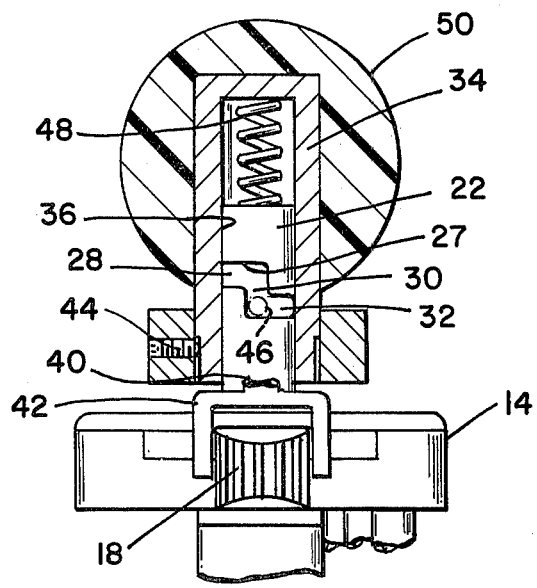
FIG_3

SHIFT CONTROL DEVICE

BACKGROUND OF THE INVENTION

This application relates to manually operated control devices, and more particularly to a knob-like control device adapted for installation on existing control units to convert a lever type control action to a twisting or turning action.

On heavy trucks or tractors for freight trailers and the like the engine transmission is controlled, at least in part, by a pneumatic shift control. Such controls in general comprise a pedestal at the driver's station with a head supporting a pneumatic valve with a movable lever control. Air lines from the latter valve extend from control head to actuators at the transmission. In normal operation, a driver used his fingers and/or thumb to move the control lever to different shift positions, and often this caused physical impairment or discomfort of the driver's hand particularly when driving in traffic.

Another problem which arose with this conventional shift lever was the tendency of a driver to move the relatively small shift lever into a low gear position accidentally when the vehicle was moving at a relatively high rate of speed. Once the control lever is moved so that pneumatic power is released, a grinding of gears causing excessive wear and possibly total failure or heavy damage to the transmission could easily occur. With many such pneumatic transmission control systems in service this seemingly simple control lever became a significant problem. Yet it would have been expensive and time consuming to alter the entire shift system.

BRIEF SUMMARY OF THE INVENTION

The present invention solves the aforementioned problems by providing a control device that requires a positive twisting or turning action that can be accomplished easily and with comfort by one hand of the driver, and which further requires a secondary force on the control device to move the device into a low gear mode, so that any inadvertent or accidental shifting is prevented.

The device utilizes a central mounting pin which is attached to the head of a conventional pneumatic transmission shifting assembly. Slidably fitted to and extending downwardly around the central pin is a sleeve member to which is fixed a suitable gripping knob so that the sleeve member and knob are movable together. Extending radially outwardly from the sleeve is an arm that is readily connectable to the pneumatic control lever of the conventional shifting assembly. Thus, rotational movement of the knob produces an arcuate movement of the arm and thus moves the control lever. The central pin has a surface groove that cooperates with a set screw extending inwardly from the inner wall of the sleeve to facilitate rotation of the sleeve and thus the knob within predetermined limits. This surface groove is shaped so that some axial force must be applied to the knob in order to turn it to the position which corresponds to the low gear position of the control lever. Thus, the driver must apply two forces to the knob to cause down-shifting, and accidental shifting into this low range at high speeds is avoided.

In summary, the objects of the present invention are: to provide a shifting control device that can be readily attached to an existing control device with lever type action to provide shifting functions controllable by a manual twisting or turning action; to provide such a shifting control device that may be quickly and easily attached to existing lever type devices; to provide a shifting control device that makes it difficult to shift accidentally into a low gear mode; and to provide such a shifting control device that is particularly well adapted for ease and economy of manufacture.

Other objects, advantages and features of my invention will become apparent from the following detailed description of one preferred embodiment thereof presented in conjunction with the accompanying drawing.

BRIEF DESCRIPTION OF THE DRAWING

FIG. 1 is a view in perspective of my shift control device attached to a conventional lever type shift control;

FIG. 2 is a view in elevation and in section of the shift control device of FIG. 1;

FIG. 3 is a view similar to FIG. 2 showing the shift device when depressed for movement into the low gear mode; and FIG. 4 is a view in section taken along line 4—4 of FIG. 2.

DETAILED DESCRIPTION OF EMBODIMENT

Referring to the drawing, FIG. 1 shows a shift control device 10 embodying the principles of the present invention as it appears when installed on a conventional pneumatic shift control 12 such as the well known Fuller-Eaton type controls. The latter control, generally used on vehicles with heavy transmissions, such as trucks or tractors, includes a control head 14 mounted on a pedestal 16, normally located adjacent the driver's station. A lever 18 is pivotally mounted in the control head near its central axis and has an outer end that is movable to different shift positions, (e.g. overdriver, drive and low) indicated on the top surface of the head 14 along its periphery. Within the control head are a series of valve parts (not shown) which control air through exterior conduits 20 to the shifting actuators on a transmission. Normally, without the control device 10 the lever is movable along the side of the control head by the driver's fingers or thumb. However, when the control device 10 is attached to the control head 14 and to its lever 18, movement of the lever is accomplished by a positive twisting or turning action.

As shown in FIG. 2, the control device comprises a central pin 22 that is mounted on the control head 14 so that it extends essentially perpendicular to its upper surface. Preferably the pin has a lower threaded end portion 24 that is adapted to fit mating threads of a bore that is centrally located on the upper surface of the control head. Above its threaded end portion 24 the pin increases in size to a body portion with a larger diameter. Just above the threaded end portion in the body portion are a pair of flat parallel surfaces 26 that are formed on opposite sides of the pin so that they can be readily gripped by a suitable wrench when the pin is installed. Higher above the flat surfaces on the pin a generally "Z" shaped groove 27 of constant width is formed in its curved outer surface. This latter groove extends essentially along one semi-cylindrical side surface of the pin and has a first portion 28 in a plane that is perpendicular to the longitudinal axis of the pin, a continuous second portion 30 in a plane that is essentially parallel to pin axis and a third portion 32 that is lower but parallel to the first groove portion. Thus, the Z-groove forms a path that controls the movement of the device 10.

A sleeve member 34 having a central bore 36 is slightly larger than and forms an easy sliding fit with the central pin 22. Attached to the lower end of the sleeve member is a circular collar 38 to which is attached a radially extending arm member 40. The latter arm member is adapted to connect with the lever 18 of the control head 14 by means of an integral forklike end portion 42 that extends downwardly on opposite sides of the lever. Extending through the collar to the sleeve member is a tapped hole for a set screw 44 that is adapted to hold the collar and its arm firmly on the sleeve member.

Fixed in the wall of the sleeve member and extending radially inwardly into the Z-groove 27 (as shown in FIG. 3), is a stud member 46 such as another set screw whose diameter is only slightly smaller than the width of the groove. Within the bore of the sleeve member above the pin is a coil spring 48 that is normally under compression so that it provides a constant axial force on the sleeve member tending to push it outwardly from the control head. Fixed to the upper end of the sleeve member above the stud member is a knob 50 that may have any convenient shape but one that is preferably generally spherical so as to be easy to grip and twist manually. The knob may be conveniently made of a hard plastic material and may be attached by press fitting it to the sleeve member.

Installation of any shift control device 10 may be accomplished quickly and easily without special tools or skilled labor. The existing assembly screw on the conventional control head (not shown) is first removed, and the set screw 44 on the collar 38 is loosened. Now, the forked end 42 of the collar arm 40 is slipped over the lever 18 on the control head 14 and the knob 50 is turned to screw the central pin 22 firmly into place in the control head. If the conventional transmission in the vehicle is the ten speed type, the lever 18 is placed in its high range position and the knob 50 is turned to the right as far as it will go thereby placing the stud member 46 in the extreme end of the lower groove portion 32. The set screw 44 on the collar is then tightened so that the collar is firmly attached to the sleeve 34. For vehicles with a conventional 3 speed transmission, the lever 18 is first placed in the direct drive position and the knob 50 is then turned to the position where it will move up and down freely, that is, where the stud member 46 is in the longitudinal groove portion 30 between the upper and lower groove portions. Again, the set screw is tightened when the knob is so positioned.

In operation, as shown in FIG. 4, a change of gear setting from high to direct or drive positions is acomplished by merely twisting the knob 50, which simultaneously turns the lever 18 to its appropriate position. The driver cannot accidentally shift into the low range, but when he wishes to do so at the proper speed, he pushes downwardly on the knob and then turns it. This action counteracts the force of the spring and allows the stud 46 to move through the longitudinal groove portion 30 (as seen in FIG. 3) into the upper groove portion 28, which allows the fork 42 to move the control lever into its low gear position.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A manual shift control device adapted for installation on a control head having a lever movable to a plurality of control positions, said control device comprising:
    a central pin means adapted to be fixed to and extend upwardly from said control head;
    a sleeve member having a central bore forming a slidable fit with said pin means;
    a knob fixed to said sleeve member;
    means attached to and extending radially outwardly from said sleeve member and having means adapted to connect with said movable lever;
    means interconnecting said sleeve member and said pin means for controlling the limits and direction of movement of said knob and thus the movement of said lever to preselected positions.

2. The shift control device as described in claim 1 wherein said central pin means has a threaded lower end portion for attaching it to said control head and a flat sided portion above said threaded portion.

3. The shift control device as described in claim 1 wherein said means attached to said sleeve member comprises an annular collar including an arm extending radially outwardly from the collar.

4. The shift control device as described in claim 3 wherein means adapted to connect with the movable lever is a fork at the outer end of said arm.

5. The shift control device as described in claim 1 wherein said interconnecting means comprises an irregular shaped groove in the surface of said central pin having parallel spaced apart opposite end portions generally transverse to the pin axis connected by a longitudinal groove portion generally parallel to the pin axis, and stud means extending inwardly from the inner wall of said sleeve member into said groove.

6. The shift control device as described in claim 5 including a coil spring retained within said sleeve member and bearing on the outer end of said central pin.

7. A manual shift control device adapted for installation on a control head of a pneumatic transmission control having a lever movable to a plurality of control positions including an overdrive position, a drive position and a low gear position, said control device comprising:
    a central pin means adapted to be fixed to and extend upwardly from said control head;
    a sleeve member having a central bore forming a slidable fit with said pin means;
    a knob fixed to the upper end of said sleeve member;
    an annular collar means located around said sleeve member;
    arm means attached to and extending radially outwardly from said sleeve member and having end means adapted to connect with said movable lever;
    an irregular shaped groove in the surface of said pin means; and
    stud means in said sleeve member extending into said groove for controlling the limits and direction of movement of said knob and thus the movement of said lever to preselected positions.

8. The shift control device as described in claim 7 wherein said irregular shaped groove in the surface of said central pin comprises parallel spaced apart opposite end portions generally transverse to the pin axis connected by a longitudinal groove portion generally parallel to the pin axis, and stud means extending inwardly from the inner wall of said sleeve member into said groove; whereby movement of said lever between the overdrive and drive positions is accomplished by turning said knob about the axis of said sleeve member, and movement of said lever to said low gear position requires axial force on said knob before turning can take place.

9. The shift control device as described in claim 7 including a coil spring retained within said sleeve member and bearing on the outer end of said central pin.

10. The shift control device as described in claim 7 wherein said annular collar means is retained on said sleeve member by a set screw.

* * * * *